(12) United States Patent
Mizuno et al.

(10) Patent No.: US 11,332,127 B2
(45) Date of Patent: May 17, 2022

(54) INFORMATION PROCESSING APPARATUS, INFORMATION PROCESSING METHOD AND SYSTEM

(71) Applicant: TOYOTA JIDOSHA KABUSHIKI KAISHA, Toyota (JP)

(72) Inventors: Yuko Mizuno, Nagoya (JP); Misa Ejiri, Nagoya (JP); Kazuyuki Kagawa, Nisshin (JP); Yuta Oshiro, Nagoya (JP); Katsuhito Kito, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/183,651

(22) Filed: Feb. 24, 2021

(65) Prior Publication Data
US 2021/0276542 A1    Sep. 9, 2021

(30) Foreign Application Priority Data

Mar. 5, 2020    (JP) .............................. JP2020-037995

(51) Int. Cl.
| | |
|---|---|
| *B60W 30/06* | (2006.01) |
| *G08G 1/017* | (2006.01) |
| *G08G 1/14* | (2006.01) |
| *G07B 15/02* | (2011.01) |

(52) U.S. Cl.
CPC ............. *B60W 30/06* (2013.01); *G08G 1/017* (2013.01); *G08G 1/143* (2013.01); *G08G 1/146* (2013.01)

(58) Field of Classification Search
CPC ....................................................... G16H 40/63
See application file for complete search history.

(56) References Cited

U.S. PATENT DOCUMENTS

| | | | |
|---|---|---|---|
| 2018/0261017 A1* | 9/2018 | Kim ...................... | B60W 30/06 |
| 2019/0176888 A1* | 6/2019 | Lee ....................... | G05D 1/0088 |
| 2020/0070815 A1* | 3/2020 | Ko ......................... | G08G 1/146 |
| 2020/0339196 A1* | 10/2020 | Jang ................... | B62D 15/0285 |
| 2020/0391605 A1* | 12/2020 | Noguchi ................. | B60L 53/60 |
| 2021/0229743 A1* | 7/2021 | Lee ..................... | G01C 21/3407 |

FOREIGN PATENT DOCUMENTS

JP    2003-335196 A    11/2003

* cited by examiner

*Primary Examiner* — Joseph H Feild
*Assistant Examiner* — Pameshanand Mahase
(74) *Attorney, Agent, or Firm* — Sughrue Mion, PLLC

(57) ABSTRACT

A controller of an information processing apparatus is programmed to obtain a size of a vehicle to be parked in a parking lot, obtain information of a current free space of the parking lot, secure from the current free space of the parking lot a parking space that the obtained size matches; and provide the vehicle with guidance information indicating the secured parking space for driving the vehicle.

18 Claims, 11 Drawing Sheets

| VEHICLE ID | SIZE | SCHEDULED TIME OF LEAVING THE PARKING LOT | PARKING SPACE |
|---|---|---|---|
| CB | LARGE | 14:00 | X21Y21 |
| CC | SMALL | 9:00 | X11Y11 |
| CD | SMALL | 16:30 | X11Y12 |
| CE | LARGE | 13:00 | X21Y22 |
| CA | SMALL | 17:00 | |

FIG. 11

PARKING SPACE ADMINISTRATION INFORMATION

| PARKING ID | XL | YL | XR | YR | PASSAGE LOCATION |
|---|---|---|---|---|---|
| 1 | 0 | 0 | 2 | 2 | UPPER, PASSAGE ID=4 |
| 2 | 0 | 2 | 0 | 4 | DOWN, PASSAGE ID=4 |
| 3 | 0 | 6 | 0 | 8 | |
| 4 | | | | | |
| 5 | | | | | |

FIG. 12

PASSAGE MANAGEMENT INFORMATION

| PASSAGE ID | XL | YL | XR | YR | NEXT PASSAGE LOCATION |
|---|---|---|---|---|---|
| 1 | 0 | 4 | 12 | 6 | 6 |
| 2 | 0 | 2 | 0 | 4 | 7, OUTGOING PATH SIDE |
| 3 | | 6 | 0 | 8 | 8, INCOMING PATH SIDE |
| 4 | | | | | |
| 5 | | | | | |

INFORMATION PROCESSING APPARATUS, INFORMATION PROCESSING METHOD AND SYSTEM

CROSS REFERENCE TO THE RELATED APPLICATION

This application claims the benefit of Japanese Patent Application No. 2020-037995, filed on Mar. 5, 2020, which is hereby incorporated by reference herein in its entirety.

FIELD

The present invention relates to an information processing apparatus, an information processing method, and a system.

BACKGROUND

Patent Document 1 discloses a parking assistance device including an imaging means for imaging externally of a vehicle, and a display means for displaying a parking position superimposed on the display screen with an image captured by the imaging means.

[Patent Document 1] JP-A-2003-335196

SUMMARY

The purpose of the present disclosure is to enable more efficient parking of a vehicle in a parking lot.

An aspect of an embodiment of the present disclosure is illustrated by an information processing apparatus comprising a control unit as a controller performing: obtaining a size of a vehicle desired to be parked in a parking lot; obtaining information of a current free space of the parking lot; securing a parking space from the current free space of the parking lot to which the obtained size matches; and providing the vehicle with guidance information indicating the parking space that has been secured for the vehicle. Another aspect of the present embodiment is exemplified by an information processing method executed by at least one computer such as an information processing apparatus. Still other aspects of embodiments are illustrated by systems comprising at least one computer, such as the information processing apparatus described above.

According to the present information processing apparatus, it is possible to further increase the parking efficiency of a vehicle in a parking lot.

BRIEF DESCRIPTION OF THE DRAWINGS

FIG. 2 is a diagram illustrating a configuration of a running unit capable of being parked;

FIG. 3 is a block diagram illustrating the configuration of a server apparatus;

FIG. 11 is a diagram illustrating a parking space administration information of a parking lot information database;

FIG. 12 is a diagram exemplifying path control information of the parking lot information data base.

DETAILED DESCRIPTION

Figure 1:
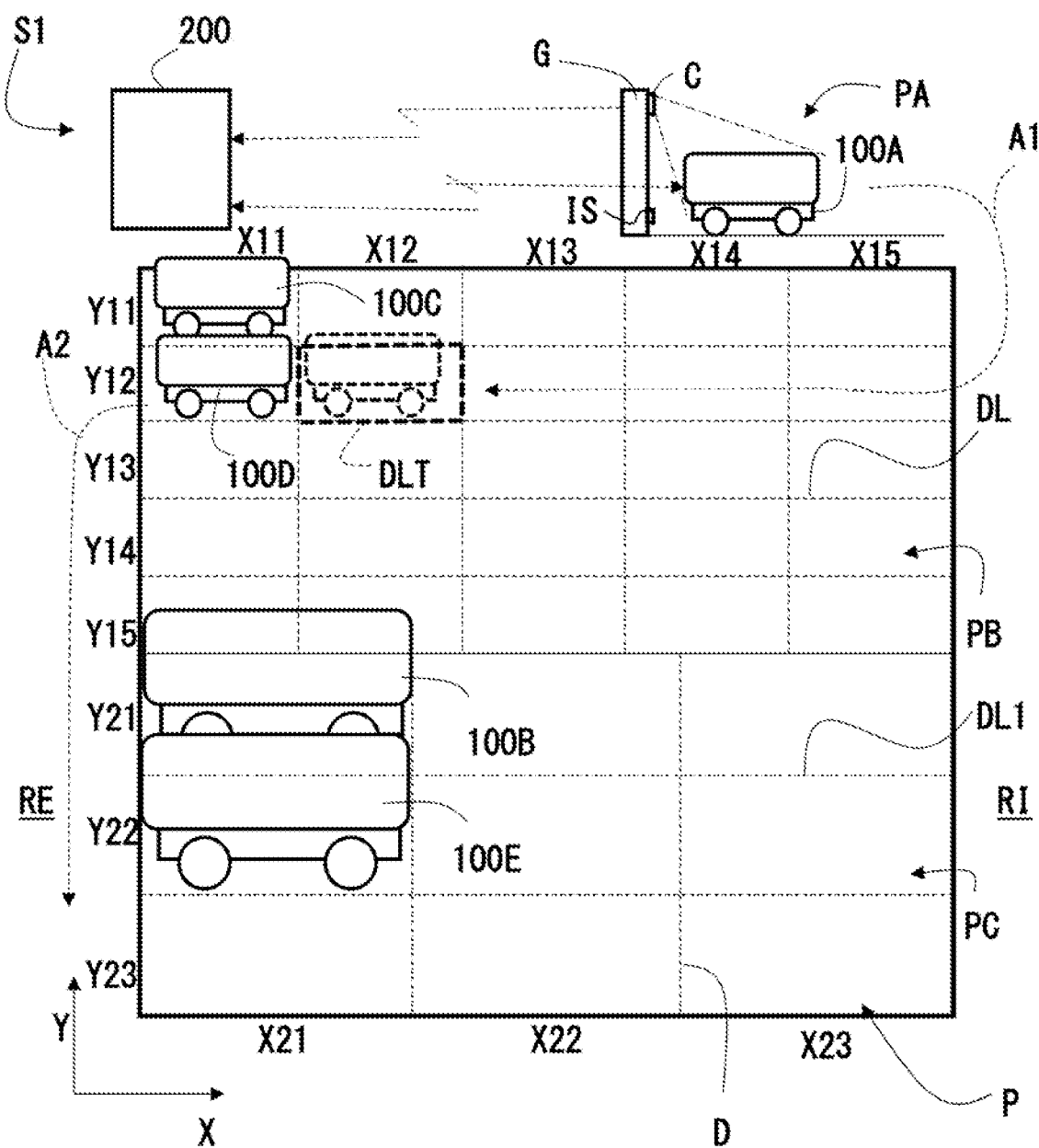
FIG. 1 is a conceptual diagram of a system according to Embodiment 1 of the present disclosure.

This embodiment exemplifies an information processing apparatus including a control unit as a controller. The controller performs obtaining a size of a vehicle desired to be parked in a parking lot, obtaining information of a current free space of the parking lot, securing a parking space that the obtained size matches from the current free space of the parking lot, and providing the vehicle with guidance information indicating the parking space that has been secured for driving the vehicle.

The information processing apparatus can, for example, obtain a size of the vehicle based on information obtained from an input device inputting information to identify the size of the vehicle which is desired to be parked in the parking lot. The information which is input is an image of the vehicle, three-dimensional dimension information measured from the vehicle by a laser, or the like. Therefore, the input device may be a photographing device for photographing an image, a three-dimensional measuring device having a light emitting portion and a light receiving portion of a laser beam for measuring the dimensions of a three-dimensional structure by a laser, an area sensor, and the like. However, the input device is not limited to these. Thus, the information processing apparatus may obtain information of the free space of the parking lot. The information of the free space may be updated as the parking space is secured. The process for securing the parking space which matches the size of the vehicle from among the free parking spaces may be done depending on schedule information of leaving the parking lot by the vehicle, and may be done to suppress the parking lot from having a moth-eaten appearance. For example, selecting the parking space to park the vehicle from the among the available free space of the parking lot in accordance with the acquired schedule information for leaving the parking lot may include selecting a parking space associated with another vehicle, referring to a parking space of the other vehicle having schedule information of leaving the parking lot that satisfies a predetermined condition for the acquired schedule information for leaving the parking lot. Also, the securing the parking space may include adjusting partition line data partitioning the parking space in the parking lot to match the acquired the size. Then, the guidance information indicating the secured parking space is provided to the vehicle for vehicle operation. With this process, the information processing apparatus may further increase the parking efficiency of the vehicle in the parking lot.

Embodiment 1

Referring to the drawings, an information processing apparatus according to an embodiment of the present disclosure, an information processing method in a control unit as a controller in the information processing apparatus thereof, and systems including the information processing apparatus thereof will be described below.

FIG. 1 conceptually shows a system S1 according to an embodiment of the disclosure. FIG. 1 conceptually illustrates one scene in system S1. The system S1 may also be referred to as a parking lot administration system.

The system S1 is configured to assist in parking a running unit 100 (100A, . . . ), which is a type of autonomous driving vehicle to be parked in a parking lot P. However, the system S1 may be applied to park a vehicle other than the autonomous driving vehicle in parking lot P.

The system S1 is equipped with a server apparatus 200 as an information processing apparatus. Here, server apparatus 200 executes various processes for parking the running unit 100 in the parking lot P. For example, server apparatus 200 is a device for instructing the running unit 100. Server apparatus 200 is provided at the end of the parking lot P, but may also be located at a point remote from the parking lot.

In this embodiment, the system S1 further comprises a camera C as a capture device capable of capturing the running unit 100 as a vehicle which is desired to be parked in the parking lot P. The capture device can be an input device that inputs information to identify a size of a vehicle. However, the size of the vehicle may be specified by the server apparatus 200 based on information from a three-dimensional measuring device having a light emitting portion and a light receiving portion of a laser, an area sensor, or the like. Further, the system S1 comprises a partition line display device D for displaying partition lines on the parking lot P. In system S1, the server apparatus 200 guides the parking of running unit 100 to parking lot P based on images of running unit 100 taken by camera C. It is noted, the system S1 may be configured without one or both of the camera C and the partition line display device D.

The server apparatus 200 is a computer on a network N. The server apparatus 200 is configured to be able to communicate with each of a plurality of running units 100s via the network N, and can cooperate with information of a processing apparatus 102 of the running unit 100 via the network N. Note that the server apparatus 200 can communicate with other server apparatus and the like via the network N. In addition to being configured to be able to communicate with each of the running units 100s, the server apparatus 200 may also be configured to be able to communicate with each of a plurality of user devices that are utilized by users riding on the running units 100s via the network N. In FIG. 1, only running unit 100A, 100B, 100C, 100D, and 100E among the plurality of running units 100s (100A, . . . ) are illustrated. However, this does not limit the number of the running unit 100, which may be any number.

Now, prior to a detailed description of the system S1, the running unit 100 which can be parked in parking lot P in the system S1 will be described.

The running unit 100 is a type of autonomous driving vehicle as described above and is also referred to as an Electric Vehicle (EVs) pallet. The running unit 100 is configured as a mobile vehicle capable of autonomous driving and unmanned driving. The system S1 may be applied to running units 100s having various sizes and configurations. In addition, the running unit 100 may not necessarily be a vehicle capable of fully autonomous driving. Here, the running unit 100 may be a human-driven vehicle or a human-assisted vehicle. The running unit 100 may be driven by a driver in the driver's seat, even during autonomous driving. The running unit 100 may be a vehicle dedicated for unattended operation.

Figure 2:
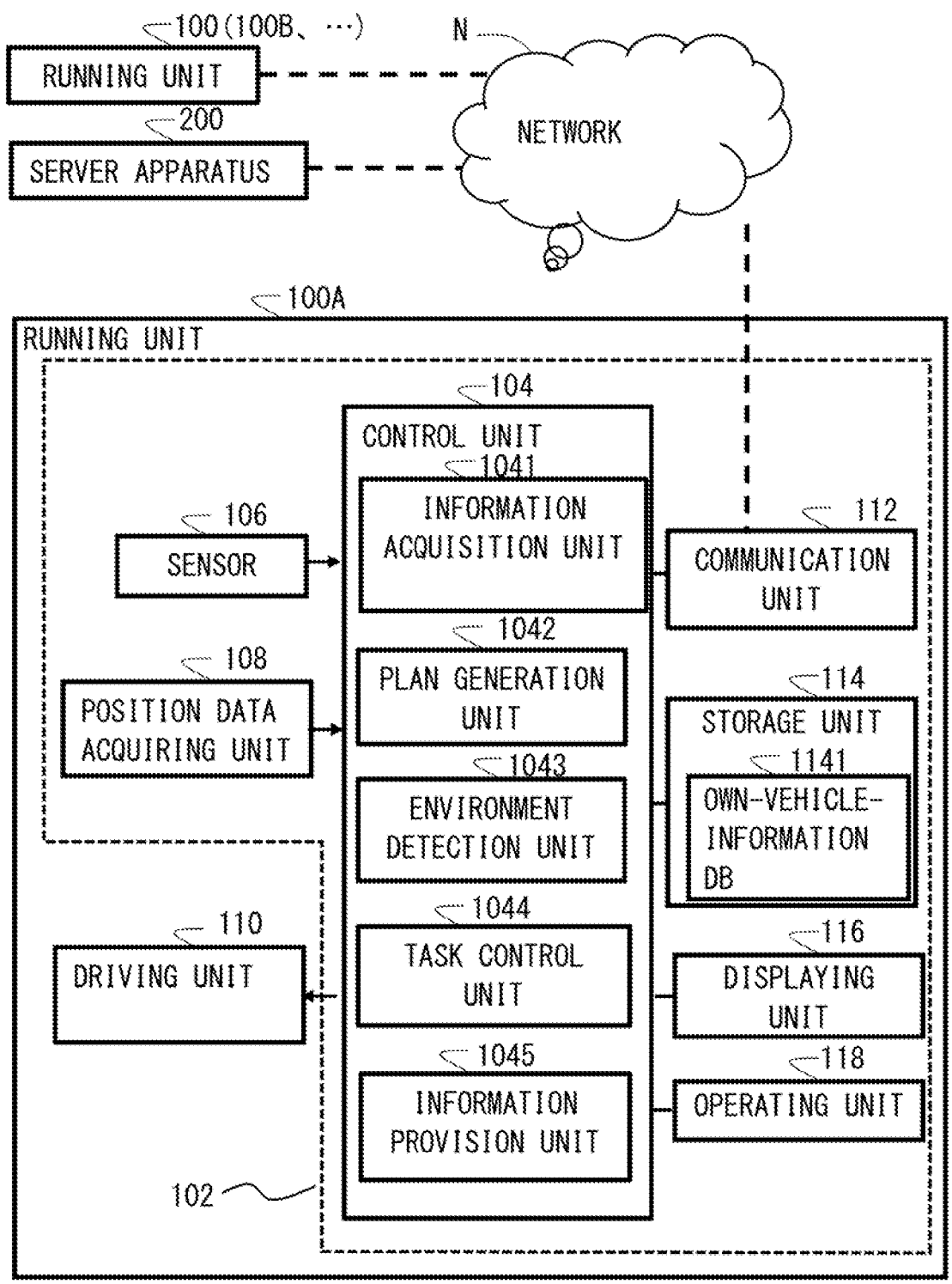
FIG. 2 is a block diagram schematically illustrating the configuration of system shown in FIG. 1, and in particular.

FIG. 2 is a block diagram schematically showing the configuration of the system S1, and in particular, FIG. 2 is a block diagram illustrating the configuration of the running unit 100A positioned in the system S1. FIG. 2 illustrates a configuration of a running unit 100A as an exemplary running unit 100. The other running unit 100 (100B, . . . ) is similarly provided with a configuration described below, for example, an information processing apparatus 102.

The running unit 100A of FIG. 2 comprises an information processing apparatus 102 and has a control unit 104 substantially providing its function. The running unit 100A can travel according to an operation command acquired from the server apparatus 200. Specifically, the running unit 100A travels in an appropriate manner while sensing the periphery of the vehicle based on the operation command acquired via the network N.

The running unit 100A further includes: a sensor 106; a position data acquiring unit 10; a driving unit 110; a communication unit 112; a storage unit 114; a displaying unit 116; and an operating unit 118. The running unit 100A operates with electric power supplied from a battery.

The sensor 106 is a means for sensing around the vehicle and typically includes stereo cameras, a laser scanner, Light Detection and Ranging, Laser Imaging Detection and Ranging (LIDAR), a radar, and the like. Information obtained by the sensor 106 is sent to the control unit 104. The sensor 106 includes a sensor for the own vehicle to perform autonomous driving. The sensor 106 includes cameras mounted on the body of the running unit 100A. For example, the camera may be a capture device using an image sensor such as a Charged-Coupled Device (CCD), Metal-Oxide-Semiconductor (MOS), or Complementary Metal-Oxide-Semiconductor (CMOS).

The position data acquiring unit 10 is a unit for obtaining the present position of the running unit 100A. The position data acquiring unit 10 is configured to include a Global Positioning System (GPS) receiver, etc. A GPS receiver as a satellite signal receiver receives signals from multiple GPS satellites. Each GPS satellite is an artificial satellite orbiting around the earth. Such satellite positioning systems, or Navigation Satellite System (NSS), are not limited to GPSs. Position information may be detected based on signals from various satellite positioning systems. The NSS is not limited to a global navigation satellite system, but may include a quasi-zenith satellite system (Quasi-Zenith Satellite System), for example, a European "Galileo" or a Japanese "Michibiki" operated integrally with GPS. The position data acquiring unit 10 may include a receiver for receiving radio waves from a transmitter such as beacons. In this instance, a plurality of transmitters may be arranged on predetermined lines of the parking lot P and the sides thereof, and periodically emit radio waves of a particular frequency and/or signal type. Position information sensing systems with the position data acquiring unit 10 are not limited to these techniques.

The control unit 104 is a device, i.e., a computer, that controls the running unit 100A based on information acquired from the sensor 106, a position data acquiring unit 10, or the like. The control unit 104 is an exemplary controller for controlling the traveling or the like of running unit 100A.

The control unit 104 includes a central processing unit (CPU) and a main storage unit, and executes information processing programmatically. The CPU is also referred to as a processor. The main storage unit of the control unit 104 is an exemplary main memory device. CPUs in the control unit 104 execute computer programs that are executable on their main storage unit and provide various functions. The main storage unit in the control unit 104 stores computer programs and/or data executed by the CPU. Main storage unit in the control unit 104 are Dynamic Random Access Memory (DRAM), Static Random Access Memory (SRAM), Read Only Memory (ROMs), etc.

The control unit 104 is connected to storage unit 114. The storage unit 114 is a so-called external storage unit, which is used as a storage area for supporting the main storage unit of the control unit 104, and stores computer programs to be executed by the control unit 104 CPUs and/or data. The storage unit 114 may be a hard disk drive, a solid state drive, etc.

The control unit 104 includes, as functional modules, an information acquisition unit 1041, a plan generation unit 1042, an environment detection unit 1043, a task control unit 1044, and an information provision unit 1045. The respective functional modules are realized by executing programs stored in the main storage unit and/or storage unit 114 by the control unit 104, that is, the CPUs thereof.

The information acquisition unit 1041 acquires information such as an operation command from the server apparatus 200. As discussed below, the server apparatus 200 can ensure a parking space for the running unit 100A desired to be parked in the parking lot P and provide guidance information to the running unit 100A for parking in the ensured parking space. The operation command from the server apparatus 200 contains its guidance information. The information acquisition unit 1041 regularly or irregularly acquires information of the own vehicle and stores it in the own-vehicle-information database 1141 of storage unit 114.

The plan generation unit 1042 generates an operation plan of the own vehicle based on the operation command acquired from the server apparatus 200, particularly based on guidance information contained therein. The operation plan generated by the plan generation unit 1042 is transmitted to the task control unit 1044, which will be described later.

The environment detection unit 1043 detects environments around the vehicle based on the data acquired by the sensor 106. The targets of detection include, but are not limited to, the number and location of lanes, the number and location of vehicles present in the vicinity of the own vehicle, the number and location of obstacles (e.g., pedestrians, bicycles, structures, buildings, etc.) present in the vicinity of the own vehicle, the construction of the roads, road signs, etc. Any object of detection can be used as long as it is necessary to perform autonomous running. The environment detection unit 1043 may also track the detected object. For example, the relative velocity of the object may be obtained from the difference between the coordinates of the object detected one step earlier and the coordinates of the current object. The data on the environment (hereinafter referred to as environment data) detected by the environment detection unit 1043 is transmitted to the task control unit 1044 (to be described later).

The task control unit 1044 controls the operation of the driving unit 110 of the own vehicle based on an operation plan generated by the plan generation unit 1042, the environmental data generated by the environment detection unit 1043, and the position information of the own vehicle acquired by the position data acquiring unit 10. For example, the task control unit 1044 runs the own vehicle along a predetermined route and so that no obstacles enter a predetermined safe area centered around the own vehicle. As a method for autonomously driving vehicle, a known method can be adopted. The task control unit 1044 can also perform tasks other than driving based on the operation plan generated by the plan generation unit 1042.

The information provision unit 1045 provides information of the own vehicle, e.g., information stored in the own-vehicle-information database 1141, to the server apparatus 200. The information stored in the own-vehicle-information database 1141 may include the size of the running unit 100A. The provision of information from the information provision unit 1046 to server apparatus 200 can be executed at any time, but is executed when the running unit 100A reaches the parking lot P or a predetermined area PA near the parking lot P. The provision of information of leaving the parking lot, which will be described later, from the information provision unit 1046 to the server apparatus 200 is executed when the running unit 100A is leaving the parking lot. This leaving the parking lot can be detected, for example, when the operating unit 118 is operated by the driver or the like. Also, this leaving the parking lot can be detected by determining that the running unit 100 has reached a path RE of leaving the parking lot. Furthermore, the fact that running unit 100 has reached the path RE of leaving the parking lot is judged based on the present position by the position data acquiring unit 10.

The driving unit 110 is a device for driving the running unit 100A based on a command generated by the task control unit 1044. The driving unit 110 is configured to include, for example, motors for driving wheels, inverters, braking, steering mechanisms, secondary batteries, and the like.

The communication unit 112 has a communication unit for connecting the running unit 100A to the network N. In the present embodiment, the running unit 100A can communicate with another device, for example, the server apparatus 200, via the network N.

The displaying unit 116 is a displaying unit that can be visually recognized by a driver or the like driving the vehicle, for example, a liquid crystal display, an electroluminescent panel or the like. The displaying unit 116 can display information such as data retrieved from the server apparatus 200 via the information acquisition unit 1041. For example, the displaying unit 116 may provide indication based on the guidance information described above. The guidance information may include information indicating the position of the parking space of the running unit 100A. The information indicating the position of the parking space may include, for example, a parking space number and/or a partition line for parking. However, when displaying the partition line for parking, it is desirable that the displaying unit 116 displays an external image of the outside of the running unit 100 captured by the camera. Further, it is desirable that a partition line is superimposed on the external images of the running unit 100.

The operating unit 118 is, for example, a switch button. The operating unit 118 includes a touch panel and may be substantially integrated with displaying unit 116.

Next, a description will be given of the server apparatus 200 in the system S1.

Figure 3:
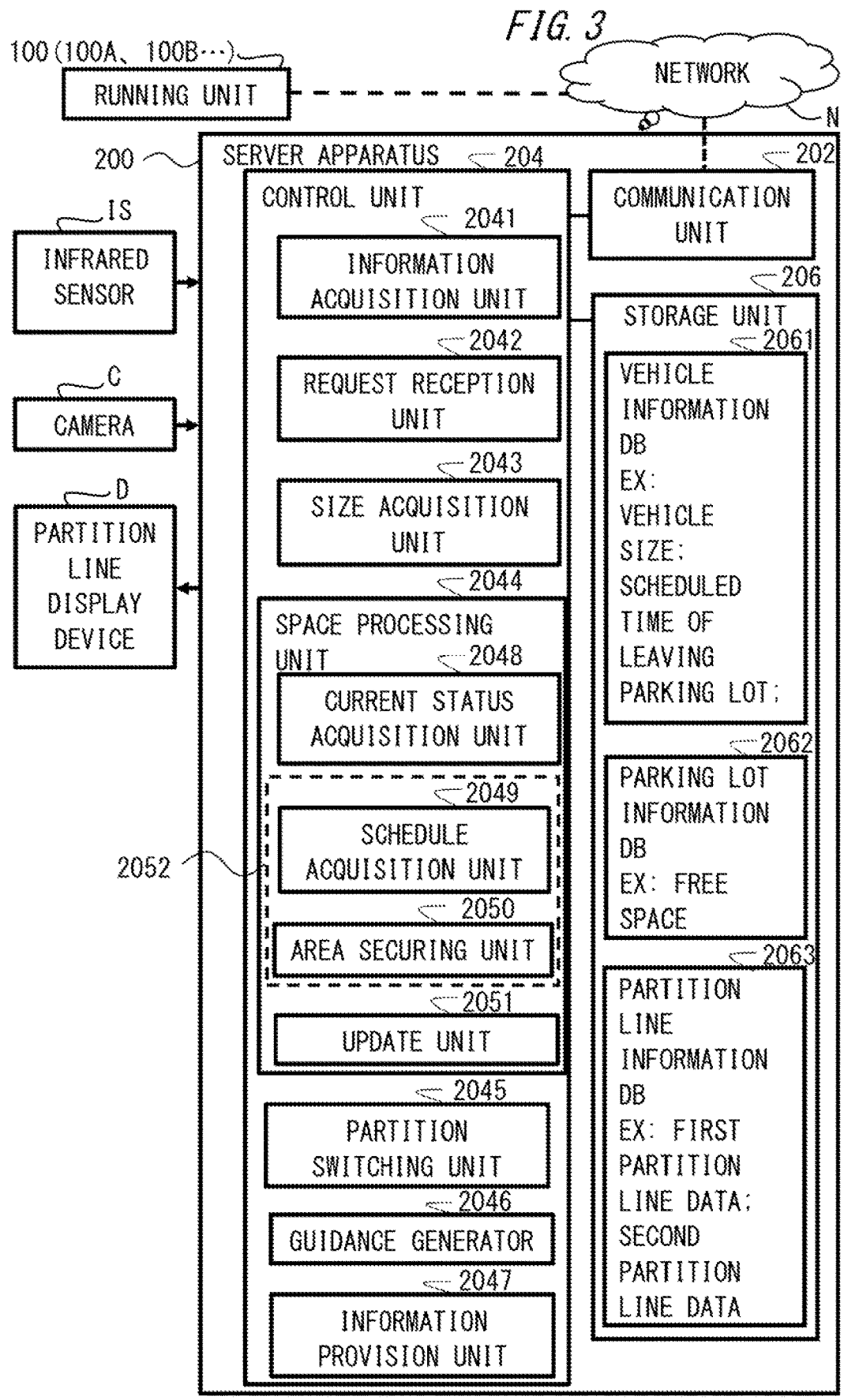
FIG. 3 is a block diagram schematically illustrating the configuration of the system of FIG. 1, and in particular.

The server apparatus 200 is an information processing apparatus as described above, and is configured to have a communication unit 202, a control unit 204, and a storage 206 as shown in FIG. 3. The communication unit 202 is similar to communication unit 112 and has a communication function for connecting the server apparatus 200 to the network N. The communication unit 202 of the server apparatus 200 is a communication interface for communicating with the running unit 100 via the network N. The control unit 204 includes CPUs and a main storage unit in the same manner as the control unit 104, and executes information processing by programs. Of course, this CPU is also a processor, and the main storage unit of the control unit 204 is also an example of the main memory device. The CPUs in the control unit 204 execute computer programs that are executable on their main storage unit and provide various functions. The main storage unit in the control unit 204 stores computer programs and/or data executed by the CPUs. The maw storage unit in control unit 204 is DRAM, SRAM, ROM, etc.

The control unit 204 is connected to the storage 206. The storage unit 206 is an external storage unit, is used as a storage area for supporting the main storage unit of the control unit 204, and stores computer programs and or data to be executed by the CPUs of the control unit 204. The storage unit 206 may be hard disk drives, solid state drives (SSDs), etc.

The control unit 204 is a device for controlling the server apparatus 200. The control unit 204 has, as shown in FIG. 3, as a functional module, an information acquisition unit 2041, a request reception unit 2042, a size acquisition unit 2043, a space processing unit 2044, a partition switching unit 2045, a guidance generator 2046, and an information provision unit 2047. The space processing unit 2044 includes functional modules such as a current status acquisition unit 2048, a schedule acquisition unit 2049, an area securing unit 2050, and an update unit 2051. These functional modules are realized by executing a program stored in the main storage unit and/or storage unit 206 by the CPU of the control unit 204. The schedule acquisition unit 2049 and the area securing unit 2050 are included in functional modules called a space securing unit 2052.

In the following explanation, it is assumed that the running unit 100 desired to be parked in parking lot P is the running unit 100A for easy comprehension.

The information acquisition unit 2041 acquires various types of information from the running unit 100A or the like. The information acquisition unit 2041 transmits the acquired information to the request reception unit 2042 or the like. Here, the information acquisition unit 2041 operates when it detects that running unit 100A reaches the predetermined (given) area PA. By the way, the detection of the running unit 100 means that the parking of the running unit 100 is desired. The detection of the running unit 100 may be based on the output from the infrared sensor IS and/or the pressure sensor installed in a given area PA, or any other sensor. Incidentally, in FIG. 1, the infrared sensor IS is provided on the gate G together with the camera C. However, the infrared sensor IS may be provided at a separate location from the camera C. That is, in FIG. 1, the infrared sensor IS operates as a parking desire detection unit. However, parking lot P may be provided with another sensor as a parking desire detection unit.

When activated, the request reception unit 2042 prompts the running unit 100A at the predetermined area PA to enter a request of reception. In other words, request reception unit 2042 transmits information to control unit 104 of the running unit 100A to cause displaying unit 116 of running unit 100A to display a screen for inputting a request. A user, such as a driver of the running unit 100A, may enter a response for the items displayed on the displaying unit 116. Examples of the items displayed on the displaying unit 116 include the size and schedule information of the vehicle leaving the parking lot. For example, the schedule information of leaving the parking lot includes scheduled time of leaving the parking lot.

The request reception unit 2042 obtains information about the size of the running unit 100A in cooperation with the control unit 104 of the running unit 100A when there is no response from a user, such as a driver of running unit 100A. Here, the size of running unit 100A may be stored in advance in the own-vehicle-information database 1141 of the storage unit 114.

Then, the request reception unit 2042 acquires the size of the running unit 100, its scheduled time of leaving the parking lot, and the like as information indicating that parking to parking lot P is desired, together with the identity information of the running unit 100A, and stores them in the vehicle information data base 2061 of storage unit 206. Then, request reception unit 2042 transmits an actuation signal to the size acquisition unit 2043.

The size acquisition unit 2043 obtains a size of running unit 100A for which parking is desired. The size acquisition unit 2043 is substantially activated by detecting that parking of running unit 100A is desired, but may be activated based on another information or the like. For example, the size acquisition unit 2043 may be activated by actuation of the request reception unit 2042 or by obtaining information from the request reception unit 2042. The size acquisition unit 2043 operates the camera C to acquire the size of running unit 100A desired to be parked in parking lot P on the basis of the photographed images of the camera C. Known image-processing techniques can be employed to acquire the size of the running unit 100A. The size acquisition unit 2043 determines whether size of the running unit 100A acquired based on the images substantially matches the size of the running unit 100A acquired via the request reception unit 2042. When it is determined that both sizes of the running unit 100 match, the size acquisition unit 2043 sends the size of the running unit 100 to the space processing unit 2044. When it is determined that both sizes of the running unit 100 do not match, the size acquisition unit 2043 may notify the administrator of the system S1 and obtain the size of the running unit 100 by inputting by the administrator. In the notification to the administrator at this time, images of the running unit 100A captured by the cameras C may also be provided to the administrator.

The space processing unit 2044 allocates a parking space to the running unit 100 where parking is desired. The space processing unit 2044 stores and manages information about free spaces in the parking spaces of parking lot P in the parking lot information data base 2062 of storage unit 206.

The current status acquisition unit 2048 of the space processing unit 2044 obtains, for example, information of the current free spaces of the parking lot P from the parking lot information data base 2062. For example, the information of free spaces may include the map information of the free spaces, the number identifying the parking space which is free, etc. The information acquired by the current status acquisition unit 2048 is transmitted to the area securing unit 2050.

The schedule acquisition unit 2049 of space processing unit 2044 acquires schedule information of leaving the parking lot such as scheduled time of leaving the parking lot from the vehicle information data base 2061. The acquired schedule information of leaving the parking lot is transmitted to the area securing unit 2050.

The area securing unit 2050 of the space processing unit 2044 selects and secures an area to be allocated as a parking space to the running unit 100A based on the information of free spaces acquired by the current status acquisition unit 2048 and the schedule information of leaving the parking lot acquired by the schedule acquisition unit 2049. The selection of regions is performed to suppress free spaces in the parking lot P from having a moth-eaten appearance, or to suppress the free spaces from being scattered around the parking lot P. More specifically, referring to a parking space of another vehicle that has schedule information for leaving the parking lot that satisfies the predetermined condition for the acquired schedule information of leaving the parking lot by the running unit 100A, the region associated with parking space of the other vehicle is selected. As a predetermined condition, it can be exemplified that the acquired scheduled leaving time is within a predetermined time after the scheduled leaving time of the other vehicle.

The space securing unit 2052 includes the aforementioned schedule acquisition unit 2049 and the aforementioned area securing unit 2050. As can be understood from the above description, the space securing unit 2052 ensures a parking space to which the acquired size of the running unit 100A matches from the obtained present free space of the parking lot P.

The update unit 2051 of space processing unit 2044 updates information of the free space of the parking lot P so as to exclude the area or parking space reserved by the area securing unit 2050 from the free space. That is, the update unit 2051 updates the parking lot information data base 2062 so that the reserved parking space is managed as a reserved space.

The partition switching unit 2045 switches the partition line data of the parking space of the parking lot P. This partition line switch is performed at least in accordance with a period of time. The partition line information data base 2063 of storage unit 206 stores first partition line data of parking lot P and second partition line data of parking lot P that partitions the parking space into a size that differs from the size of the parking space partitioned by the first partition line data. In the present embodiment, the first partition line data is partition line data for weekdays, and the second partition line data is partition line data for holidays. Here, since the parking lot P is adjoined by the facilities in the unit of a family or the like on holidays, the second partition line data is constructed so that the proportion of parking space for the small running unit 100 for which utilization is predicted in the unit of a family is relatively large compared to the first partition line data. The first partition line data and the second partition line data are not limited to being switched between the period of time on weekdays and the period of time on holidays, and may be switched according to, for example, the period of time during daytime and the period of time during nighttime. The data switched by the switching of partition line data is transmitted from the partition switching unit 2045 to the partition line display device D. Thus, the partition line according to the switched partition line data can be displayed on the parking lot P by the partition line data display device D. It is noted, the partition line display device D has a plurality of LED lights embedded in the parking surface of the parking lot P, to turn on a portion of the LED light, by turning off the remaining LED light, to display partition line. Therefore, on the parking surface of the parking lot P, the LED light is buried in a square shape. However, the partition line display device D is not limited to such a configuration in which it is embedded, and may have a configuration for irradiating light from above to the parking surface of the parking lot P. The partition switching unit 2045 may switch partition line data based on information other than period of time. For example, the partition line may be switched depending on the type of vehicle that is desired to be parked in the parking lot, e.g., the size.

The guidance generator 2046 generates a guidance information indicative of the parking space secured by the area securing unit 2050 of the space processing unit 2044. This guidance information contains the identity information, e.g. the number, of the reserved parking space.

The information provision unit 2047 provides or transmits guidance information generated by the guidance generator 2046 to the running unit 100A. When this guidance information is sent to the running unit 100A, the vehicle information data base 2061 may be referred to. The information provision unit 2047 transmits the guidance information to the partition line display device D. As a result, partition lines indicating the secured parking space among a plurality of partition lines can be visually displayed to the driver or the like who drives running unit 100A. For example, a typical partition line of parking lot P may be displayed with a white light, whereas a partition line of the reserved parking space may be displayed with a light of a different color, e.g. a red light.

Here, the configuration of the parking lot P to which the system S1 is applied will be further described with reference to FIG. 1. The parking lot P has a first parking area PB for a running unit 100 of the normal or small size, and a second parking area PC for a relatively large running unit 100. In FIG. 1, the parking lot P can specify the parking space of the parking lot P by the combined number of the "X" code in the horizontal direction in FIG. 1 and the "Y" code in the vertical direction in FIG. 1. The first parking area PB has 25 parking spaces from the "X11Y11" space of the upper left end in FIG. 1 to the "X15Y15" space of the lower right in FIG. 1. The second parking area PC has nine parking spaces from the "X21Y21" space on the upper left side in FIG. 1 to the "X23Y23" space on the lower right end in FIG. 1. Then, in FIG. 1, the entry path RI to enter the parking lot P is provided on the right side of the parking lot P, and the leaving path RE to exit from the parking lot P is provided on the left side of the parking lot P. In principle, when parking in a parking space, the running unit 100A can reach its parking space via an incoming path RI (see, e.g., arrow A1 in FIG. 1) and leaving the parking lot from its parking space via the leaving path RE (see, e.g., arrow A2 in FIG. 1).

Partition lines of a parking space at parking lot P are indicated by the illumination of some LEDs on the partition line display device D as previously described. Therefore, by changing the illuminated LEDs of the partition line display device D, the displayed partition line can be changed. In this embodiment, as described above, the operation of the partition switching unit 2045 of the control unit 204 of the server apparatus 200 switches the display of the partition line at the parking lot P according to a period of time.

Switching of the partition line data for the displaying partition line will be described with reference to the flow chart of FIG. 4. The partition switching unit 2045 of the control unit 204 of the server apparatus 200 determines whether or not the present time measured by the clock device of the control unit 204 is the timing of switching (step S401). Here, the partition line DL1 based on the first partition line data for the weekday period of time is displayed in FIG. 1. Therefore, the timing of switching here is the timing of switching from the period of time on weekdays to the period of time on holidays, for example, 6:00 a.m. on holidays after weekdays. The timing of such switching may be such that the server apparatus 200 presents the recommended timing to the parking lot administrator by accumulating and analyzing information such as sizes or types of vehicles to be parked.

Figure 5:
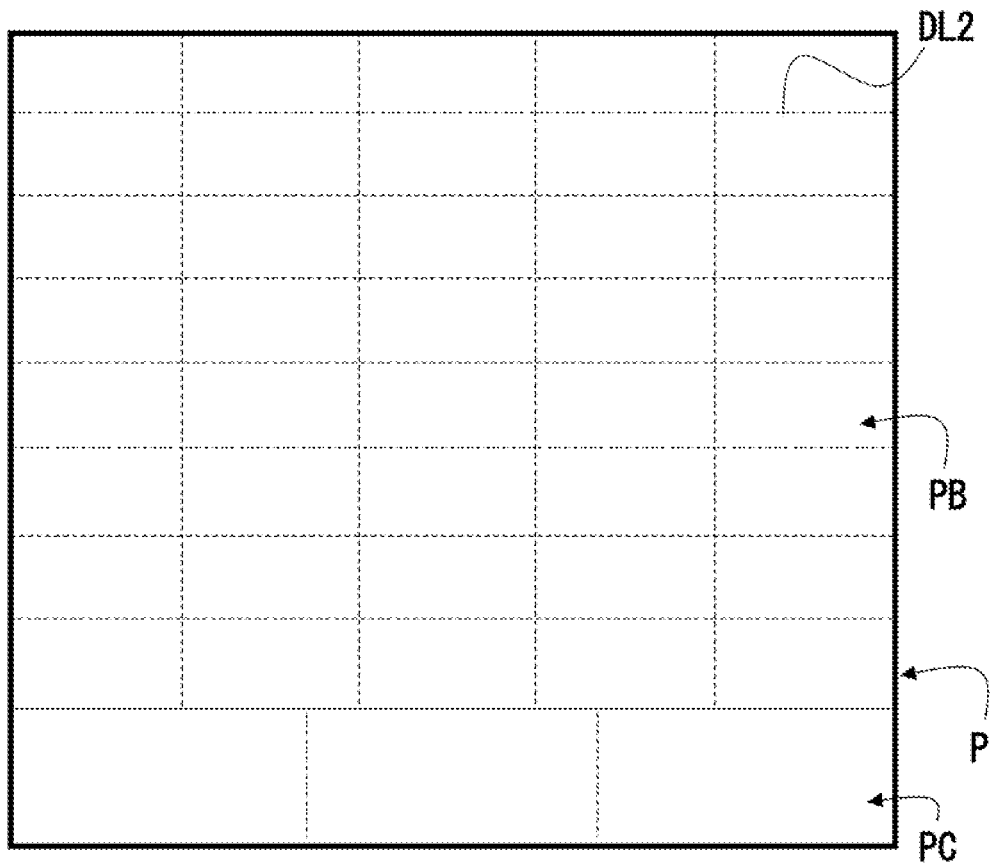
FIG. 5 is an illustration of another partition line of a parking lot in the system of FIG. 1.

The partition switching unit 2045 switches the data for the partition line DL of the parking lot P from the first partition line data to the second partition line data (step S403) when the current time is the timing of switching (affirmative determination its step S401). By this switching, the second partition line data is extracted from the partition line information data base 2063 of the storage unit 206, and the extracted data is provided to the partition line display device D. As a result, partition line DL2 based on the second partition line data for holidays is displayed on parking lot P. FIG. 5 illustrates a partition line DL2 displayed by the partition line display device D in parking lot P. By comparing partition line DL1 of FIG. 1 with partition line DL2 of FIG. 5, the respective changes of the first parking area PB and the second parking area PC can be understood. The same applies to the switching from the second partition line data to the first partition line data.

Figure 4:
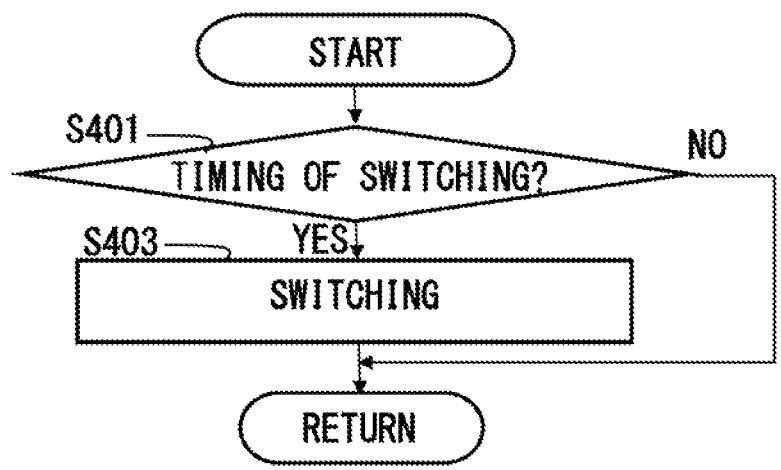
FIG. 4 is a flow chart of the switching control of a partition line of a parking lot by a control unit of a server apparatus in the system of FIG. 1.

When the current time is not the switching timing (negative determination is made in step S401), the routine of FIG. 4 ends. Then, the next routine is repeated.

Next, referring to FIG. 6, guidance of the parking lot P for the running unit 100A to a parking space in the system S1 will be described. Here, it is assumed that parking lot P is in the state shown in FIG. 1 and that the relatively small running unit 100C, 100D is parked in the first parking area PB of the parking lot P and the relatively large running unit 100B, 100E is parked in the second parking area PC.

The server apparatus 200 in the system S1 detects that the running unit 100A as an exemplary vehicle reaches the predetermined region PA of parking lot P based on the outputs from the infrared sensor IS provided in the gates G of the predetermined region PA. Along with this, the request reception unit 2042 of the server apparatus 200 operates to obtain information indicating that parking the running unit 100A in the parking lot P is desired by communication with the running unit 100A. The obtained information here includes the size of the running unit 100A and the scheduled time the unit 100A will be leaving the parking lot, along with the identity information of the running unit 100A. The request reception unit 2042 stores the information in the vehicle information data base 2061 of the storage unit 296, and transmits predetermined signals to the size acquisition unit 2043.

In response to this, the size acquisition unit 2043 operates to acquire the size of the running unit 100 (step S601). Acquiring the size is performed based on images taken by the camera C as shown schematically in FIG. 1. When the size acquired based on the image substantially matches the size acquired in communication with the running unit 100A, the size acquired based on the image is decided as the size of the running unit 100A. In the present embodiment, it is determined whether the size of the running unit 100A is a large size or a small size, and the determined size is stored as size of the running unit 100A. The running unit 100A is small in embodiment 1.

Then, the space processing unit 2044 of the server apparatus 200 is activated. In the space processing unit 2044, the current status acquisition unit 2048 acquires the current information of the free space of the parking lot from the parking lot information data base 2062 (step S603). For example, the data "X12Y11~X15Y11", "X12Y12~X15Y12", "X11Y13~X15Y13", "X11Y14~X15Y14" and "X11Y15~X15Y15" are acquired as the free space for the small running unit 100A. At this time, information of the free space of the second parking area PCs may be acquired without being limited to the free space of the first parking area PBs.

Figures 7, 8:
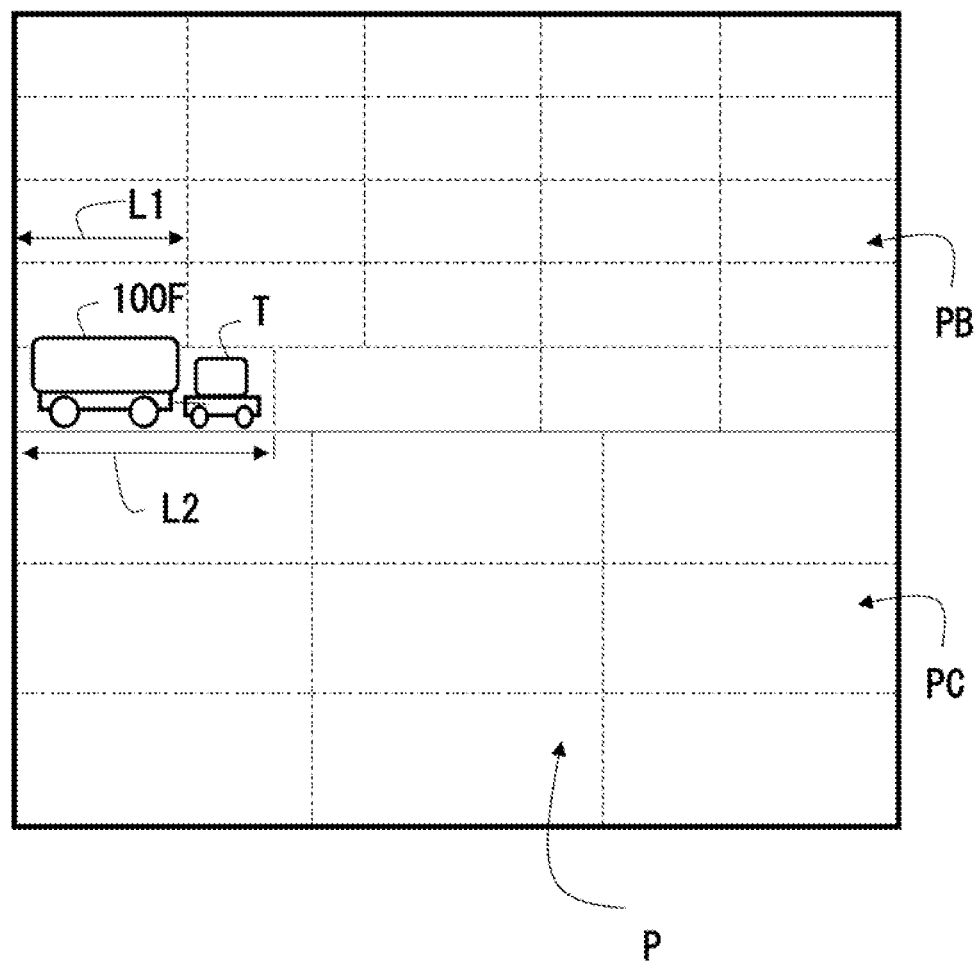
FIG. 7 is a diagram showing information of a plurality of vehicles.
FIG. 8 is a diagram for explaining a change of a partition line of a parking lot.

The schedule acquisition unit 2049 of the space processing unit 2044 searches the vehicle information data base 2061 and acquires the scheduled time the running unit 100A will be leaving the parking lot as the scheduled information of the running unit 100A (step S605). Here, FIG. 7 shows a list of vehicle IDs of the respective running units 100s in the parking lot P, each size, each scheduled time of leaving the parking lot, and each parking space. Vehicle IDs "CA", "CB", "CC", "CD", and "CE" correspond to the running unit 100A, 100B, 100C, 100D, and 100E, respectively.

Since the scheduled time of leaving the parking lot of the running unit 100A is 17 o'clock, the area securing unit 2050 of space processing unit 2044 refers to vehicle information data base 2061 (for example, see FIG. 7) to determine whether or not there is a running unit 100 that satisfies a predetermined condition with respect to the scheduled time of leaving the parking lot. The predetermined condition is set so as to suppress the parking lot P from becoming moth-eaten in appearance. Here, the running unit 100 satisfying the predetermined condition is a parked vehicle having a scheduled time of leaving the parking lot of up to a predetermined time (e.g., one hour) prior to the scheduled time of leaving the parking lot of running unit 100A. The running unit 100D having the vehicle ID "CD" satisfies this predetermined condition. The scheduled time of leaving the parking lot of the running unit 100D is 16:30. The area securing unit 2050 then references a parking space of the other running unit 100D, namely "X11Y12" space. The area securing unit 2050 selects the area associated with parking space (here, "Y12" area, i.e., "X12Y12", "X13Y12", "X14Y12", and "X15Y12") as the area where running unit 100A is to be parked. Further, the area securing unit 2050 specifies and secures the "X12Y12" space as the parking space of running unit 100A from among the selected areas in accordance with a predetermined discipline (step S607). The predetermined discipline here is, but is not limited to, the front side of running unit 100D, that is, incoming path RI side, and the space closest to parking space of running unit 100D.

When there is no free space that satisfies the predetermined condition and the scheduled time of leaving the parking lot of running unit 100A is relatively early (e.g., when the scheduled time of leaving the parking lot is one hour or less from that time), the area securing unit 2050 specifies a free space in which none of running units 100s is parked among free spaces close to the outgoing path RE. For example, the "X11Y13" free space of FIG. 1 is then selected. On the other hand, when there is no free space satisfying this condition and the scheduled time of leaving the parking lot of running unit 100A is relatively late, the area securing unit 2050 identifies one of running units 100s parked on the outgoing path RE side, which has a scheduled time of leaving the parking lot earlier than and closest to the scheduled time of leaving the parking lot of running unit 100A that wants to park. Then, the area securing unit 2050 identifies the same lane as the parking space where the identified running unit 100 is parked. In the example of FIG. 7, the area securing unit 2050 specifies, for example, a free space of the "Y11" areas. For example, when the scheduled time of leaving the parking lot of running unit 100C among the plurality of running units 100 is earlier than and closest to the scheduled time of leaving the parking lot of running unit 100A, "X12Y11" free space is selected in FIG. 1. These definitions, procedures and rules are examples and can be arbitrarily set, but may be decided so as to suppress free spaces in the parking lot from having a moth-eaten appearance, i.e., being scattered in the parking lot.

The scheduled time of leaving the parking lot may not be decided. In this case, the area securing unit 2050 secures a parking space in accordance with a predetermined sequence, such as from the left in FIG. 1. However, the securing of a parking space in this instance is the same as the process of the above embodiment in that it is executed so as to secure the parking space to which the size acquired for running unit 100A matches.

When the parking space of running unit 100A can be secured (affirmative determination is made in step S609), the update unit 2051 of the space processing unit 2044 updates the parking lot information data base 2062 (step S611). For example, when the "X12Y12" free space is reserved as the parking space of the running unit 100A, the update unit 2051 designates the "X12Y12" free space as the parking space of the running unit 100A, and updates the parking lot information data base 2062. Since the free space is reduced by this process, this process is an example of update unit 2051 updating information of the free space of the parking lot when a change occurs in the free space of the parking lot. At this time, the data relating to the running unit 100A of vehicle information data base 2061 may also be updated so as to be associated with the parking space.

Then, the guidance generator 2046 of the control unit 204 of the server apparatus 200 generates guidance information for parking the running unit 100A in the "X12Y12" space (step S613). This guidance information includes the position information of "X12Y12" space, etc.

As a result, the information provision unit 2047 of the server apparatus 200 provides or transmits an operation command including the generated guidance information to the control unit 104 of the running unit 100A (step S615). The control unit 104 of the running unit 100A acquires the operation command and controls the autonomous running of the running unit 100 based on the guidance information. At this time, the guidance information may be provided to the control unit 104 having the displaying unit 116 so that the position and the like of the parking space of the guidance information may be displayed on the displaying unit 116 of the running unit 100A. The driver may drive the running unit 100A to the secured parking space.

At this time, the information provision unit 2047 also transmits the guidance information to the partition line display device D (step S615). As a result, the partition lines (DLT in FIG. 1) of the parking space secured among partition lines of the parking lot P can be visually displayed to the driver or the like who operates the running unit 100A.

When the parking space of the running unit 100A cannot be secured (negative determination is made in step S609), the guidance generator 2046 reads the parking-disabled information from the storage unit 206 (step S617). The information provision unit 2047 transmits the read parking-disabled information to the control unit 104 of running unit 100A (step S619).

The securing of a parking space for the running unit 100 by the area securing unit 2050 is not limited to the above-mentioned method. The process or securing the parking space may include adjusting partition line data partitioning the parking space in the parking lot P to fit the size obtained for the running unit 100. For example, as shown in FIG. 8, when the running unit 100F desired to be parked in parking lot P has a traction vehicle T, the running unit 100F cannot be parked within the default parking space of the first parking area PB. Therefore, in such a case, it is preferable to adjust the partition line data for partitioning the parking space in the parking lot. In FIG. 8, the first partition line data is adjusted so that the length in the direction corresponding to the longitudinal direction of the running unit 100 (the lateral direction in FIG. 1) in the partition lines of the parking space for one running unit of the first parking area PB is lengthened to a length L2 that is longer than the length L1 of the basic setting. The partition line data may be varied to reduce the length of partition line data.

As described above, in the system S1, the control unit 204 of the server apparatus 200 executes: obtaining of the size of the running unit 100A as a vehicle desired to be parked in parking lot P; and obtaining information of the current free spaces of parking lot P. Then, the control unit 204 secures a parking space to which the size of the acquired running unit 100A matches from among the current free spaces of the parking lot P. Further, the control unit 204 provides guidance information indicating the reserved parking space to the running unit 100A for the operation of the running unit 100A. Therefore, the running unit 100A can be parked efficiently according to the size of the running unit 100A.

In the parking method of the present embodiment illustrated in FIG. 1, the running unit 100 enters and leaves a group of parking space X i Y j (e.g., j=11, 12, . . . ) sharing the Y coordinate by a so-called first-in first-out process. That is, running unit 100A is parked in order from the leading parking space near the outgoing path RE on the left side of FIG. 1, and the running unit 100A is turned leaving the parking lot in that order. Then, in a group of parking space XiYj (e.g., j=11, 12, . . . ), the running unit 100A is leaving the parking lot in order from the first parking space close to the outgoing path RE. In this procedure, until all groups of parking space XiYj (e.g., j=11, 12, . . . ) are empty, no other running unit 100 can be parked in any free space among the groups of parking space XiYj (e.g., j=11, 12, . . . ) even if one running unit 100A left the parking lot and the free space was made.

However, the above-mentioned limitation can be solved when all the parked running units 100 can be autonomously driven and the facility provided in the parking lot P can move the running units 100. The case where the facility provided in the parking lot P can move the running unit 100 is exemplified as follows. That is, if a key or a duplicate of the key that activates the driving unit 110 of the running unit 100 is left to the administrator of parking lot P, or if information that enables activation of the driving unit 110 instead of the key is held in server apparatus 200, the server apparatus 200 may execute a process of sequentially moving the running units 100 from another parking space on the incoming path RI side to an empty parking space close to the outgoing path RE. The process of sequentially moving the running units 100 to a parking space close to the outgoing path RE is called space-aggregation processing by progressive feed.

In this instance, the server apparatus 200 searches for a running unit 100 with an empty left side (the parking space close to outgoing path RE is empty) in FIG. 1 of a group of parking space XiYj (e.g., j=11, 12, . . . ) among the respective running units 100 in the parking lot P. Then, the server apparatus 200 extracts the searched running unit 100 as a moving object. Then, the server apparatus 200 starts the driving unit 110 of the running unit 100 to be moved, or the server apparatus 200 sends an instruction to start the driving unit 110 to the running unit 100 to start driving unit 110. Then, the server apparatus 200 transmits to the running unit 100 of which the parking space on the outgoing path RE side is vacant, a command including a guidance information for guiding the movement to a parking space on the outgoing path RE side. In this context, the update unit 2051 updates the parking lot information data base 2062. It is noted, the information provision unit 2047 also sends the guidance information to the partition line display device D and changes the position of the partition line displayed by the partition line display device D for the movement of the running unit 100 to be moved. This is because the site of the free parking space on the outgoing path RE side and the size of the running unit 100 to be moved do not match, and the position of the partition line may be changed.

Figure 9:
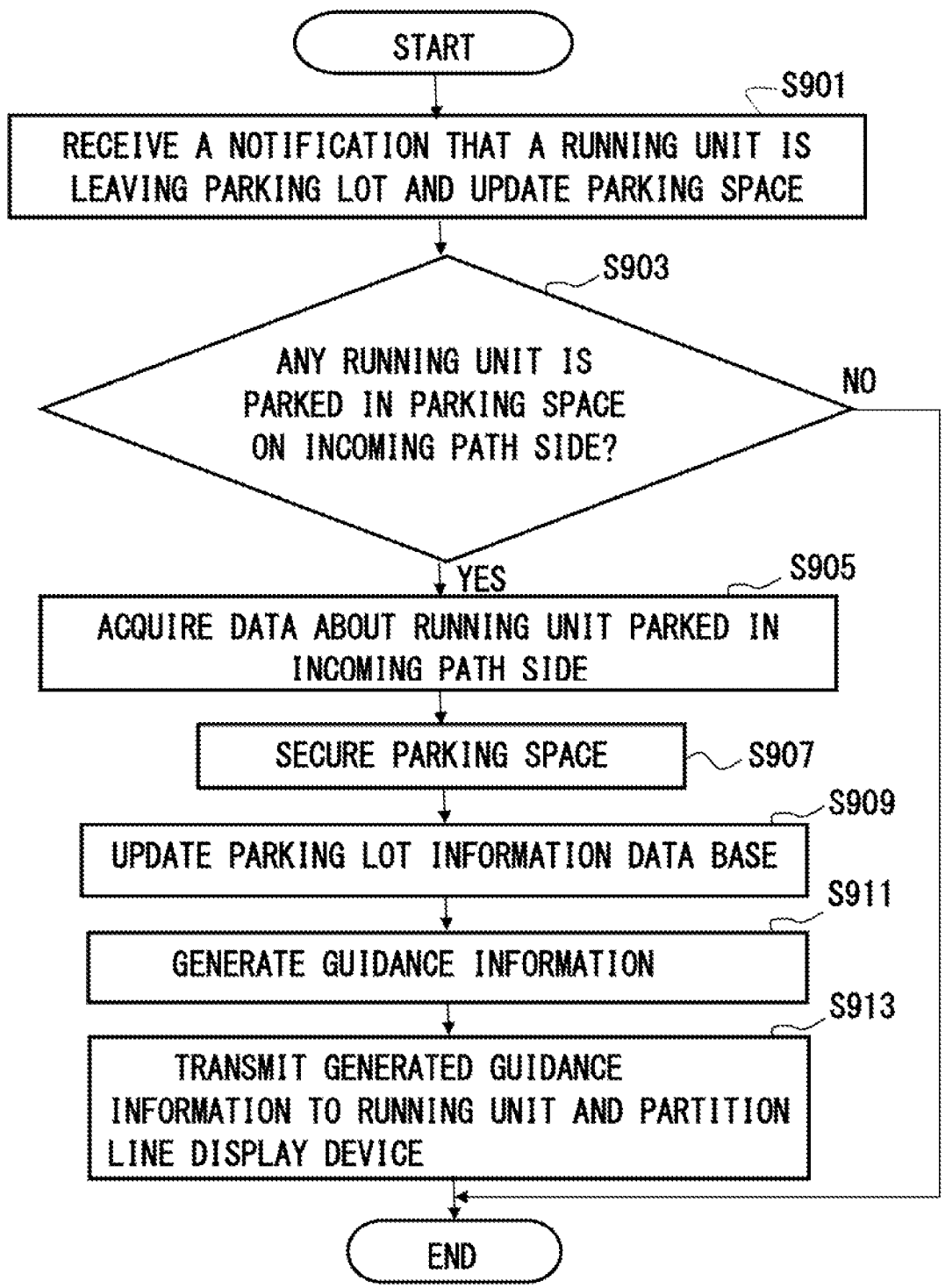
FIG. 9 is a further flow chart according to a control unit of a server apparatus in the system of FIG. 1.

FIG. 9 is a diagram exemplifying the space aggregation processing by the sequential moving. The space aggregation process by the sequential moving of FIG. 9 is executed, for example, when the running unit 100A performs leaving the parking lot. In this process, first, the information acquisition unit 2041 of control unit 204 of the server apparatus 200 receives a notification that a running unit 100A is leaving the parking lot from the running unit that is to leave the parking lot (step S901). This notification includes the identity information of running unit 100A that will leave the parking lot. Then, the update unit 2051 identifies the vehicle leaving the parking lot based on the identification information, specifies the parking space used by the vehicle based on the vehicle information data base 2061 and the parking lot information data base 2062, and updates the parking space as free space. Since the amount of free space is increased by this processing, this processing is an example in which the update unit 2051 updates information of the free space of parking lot when a change occurs for the free space of the parking lot.

The current status acquisition unit 2048 in the space processing unit 2044 of the control unit 204 of the server apparatus 200 determines whether or not any running unit 100 is parked in the parking space on the incoming path RI side of the parking space of the running unit 100A that has left the parking lot (step S903). If any running unit 100 is not parked (negative determination is made in step S903), the routine ends.

When a running unit 100 is parked in a parking space of the incoming path RI side with respect to a parking space of running unit 100A that has left the parking lot (affirmative determination is made in step S903), the process by the space processing unit 2044 is executed. The current status acquisition unit 2048 of the space processing unit 2044 acquires data about running unit 100 parked in the incoming path RI-side parking space. This is performed by extracting the data (e.g., the size of the running unit 100) for the running unit 100 of the vehicle information data base 2061, which is associated with a parking space of the parking lot information data base 2062 (step S905). Then, the area securing unit 2050 of the space processing unit 2044 secures the parking space corresponding to the extracted data relating to the running unit 100 in the parking space used by running unit 100A that has left the parking lot (step S907). Accordingly, the update unit 2051 of the space processing unit 2044 updates the parking lot information data base 2062 (step S909). This process is an exemplary process in which the update unit 2051 updates information of the free space of the parking lot when a change occurs in the free space of the parking lot. Then, the guidance generator 2046 generates guidance information so as to move the running unit 100 to the secured parking space (step S911). As a result, the information provision unit 2047 transmits the generated guidance information to the running unit 100 and the partition line display device D (step S913).

In FIG. 9, the space aggregation process by the sequential moving is executed, for example, when the running unit 100A performs leaving the parking lot. Instead of such processing, however, the space aggregation processing by the sequential moving may be executed periodically. In this case, first, each running unit searches for a parked parking space, and when there is an empty parking space on the outgoing RE side, each parked running unit may be moved to the empty parking space on the outgoing RE side.

Through the process described above, as illustrated in FIG. 1, even when a running unit 100 is parked with no passage between parking spaces, the parked running unit 100 is sequentially moved to outgoing path RE side. Therefore, available parking spaces can be aggregated and the running unit 100 can be parked efficiently in the parking lot P.

Embodiment 2

In the first embodiment, as illustrated in FIG. 1, it is assumed that parking space is a group of parking space XiYj (e.g., j=11, 12, . . . ) sharing the Y coordinate. In the second exemplary embodiment, the process of the system S2 for freely securing a parking space with respect to the running unit 100 within parking lot P without such a premise is illustrated.

Figure 10:
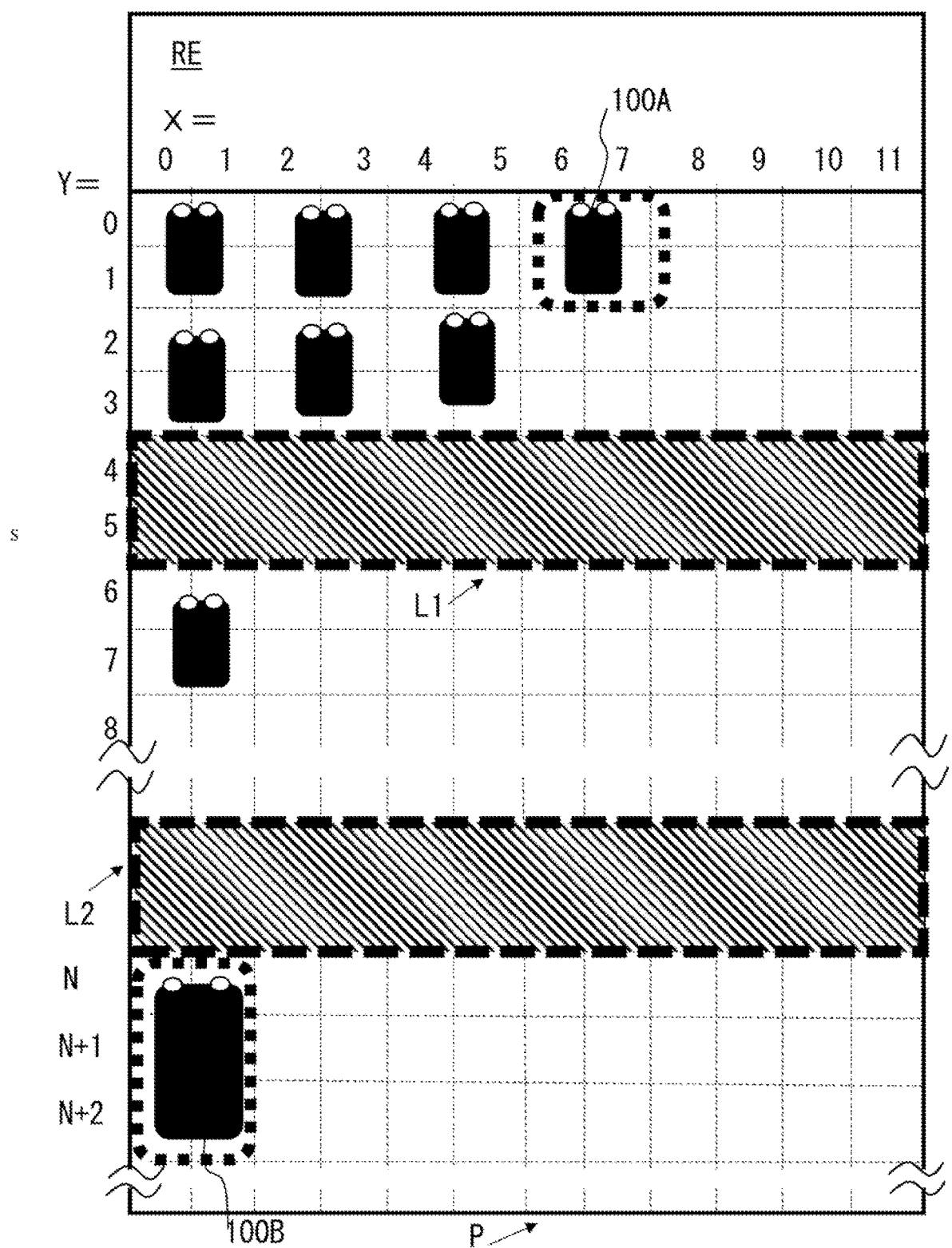
FIG. 10 is a diagram exemplifying a parking space in a parking lot in the system according to the second embodiment of the present disclosure.

FIG. 10 is a diagram illustrating parking spaces in the parking lot P in the system S2 according to the second embodiment. In the second embodiment, the parking lot P is divided into meshes, and serial numbers in the X direction and the direction are assigned to the meshes. An outgoing path RE is provided on the upper side in FIG. 10. Further, in FIG. 10, for example, the lateral rightward direction is a direction X in which the serial number increases. In FIG. 10, for example, the vertical downward direction is a direction Y in which the serial number increases. Size (DX, DY) of the meshes is appropriately set according to the size of the running unit 100 parked in a parking space, variations thereof, or the like. By multiplying the serial numbers (I, J) of the meshes in the X direction and the Y direction of each mesh by size (DX, DY) of the meshes, the position of each mesh, the distances between meshes, and the like can be grasped. Incidentally, the partition line display device D may be provided at the border of the mesh. However, a partition line may be displayed on a display of the running unit 100, a head-mounted display, or the like.

A parking space is assigned according to the size of the running unit 100. The assigned parking space is defined by the number of the mesh. For example, in FIG. 10, a parking space of meshes (6, 0) to (7, 1) is assigned to running unit 100A. A parking space of meshes (0, N) to (1, N+2) is assigned to the running unit 100B. In FIG. 10, a parking space can be specified by the values (X, Y) of the upper left mesh and the lower right mesh, respectively.

Passages L1, L2, and the like are formed in the parking lot P according to a predetermined rule. The predetermined rule, for example, when a plurality of running units 100s including N consecutive running units 100s in the vertical direction (Y direction) is parked sequentially side by side, on the rear side of the rearmost running unit 100 of the plurality of running units 100s, a passage that traverses the parking lot P (X direction) is formed or the like. FIG. 10 is an example of N=2, but is not limited to N=2. When the running unit 100 is an autonomous driving vehicle capable of automatic operation and N is set to 3 or more, as an FIG. 9, the space-aggregation process by a sequential moving operation may be executed.

Figure 6:
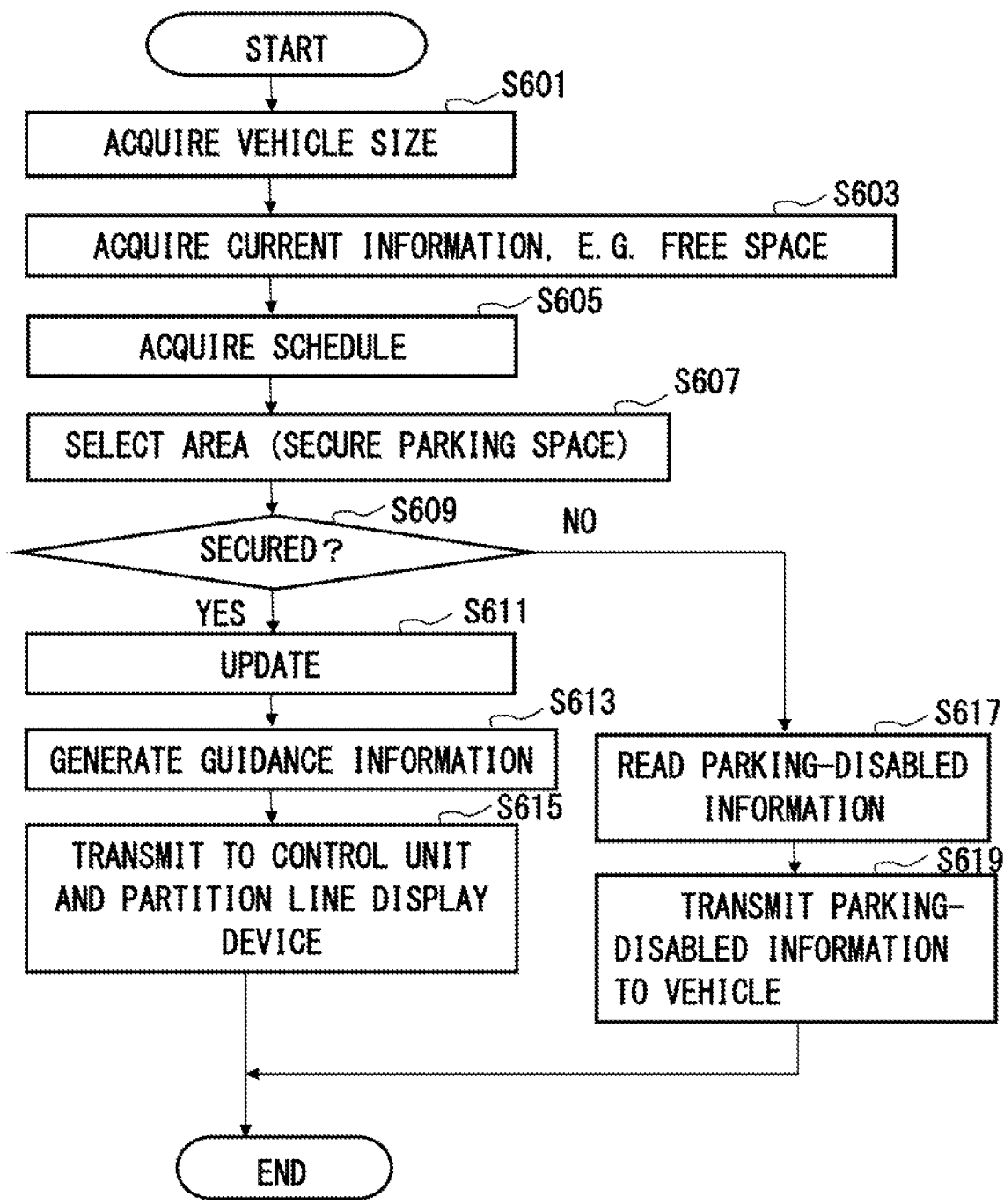
FIG. 6 is a flow chart of a parking assistance by control unit of a server apparatus in the system of FIG. 1.

The procedure for guiding the manning unit 100 to a parking space of the parking lot P by the system S2 is almost the same as in FIG. 6. That is, even in the second exemplary embodiment, the system S2 acquires the size of running unit 100 which is a vehicle. The system S2 then classifies the vehicle by the size and ensures that the parking spaces of the two or more vehicles classified as same class are close to each other. In this way, the parking space can be set efficiently by the parked running unit where the size is similar.

Furthermore, the system S2 may acquire scheduled time of leaving the parking lot for the running unit 100 that is guided to the parking space prior to securing the parking space. The system S2 may collect data of vehicles whose scheduled time of leaving the parking lot is close to each other in parking spaces where the positions in the moving direction (X direction) coincide with each other (parking spaces where the values of X coincide with each other in FIG. 10). As a result, a moth-eaten appearance is also prevented in the second embodiment. However, in the second embodiment, since the passages L1, L2, and the like are formed according to the predetermined rule, it is not essential to collect vehicles each having scheduled times for leaving the parking lot that close to each other in a parking space in which the traveling directions at the time of leaving the parking lot coincide with each other. For example, when the passages L1, L2, and the like are formed for every two parking spaces, even if utilization portions of parking lot P become moth-eaten in appearance, there are no problems.

Then, the system S2 may select an area from the parking lot P and transmit guidance information to the running unit 100 and the partition line display device D. The process when any parking space cannot be secured is the same as that in FIG. 6.

FIG. 11 is a diagram illustrating parking space administration information of the parking lot information data base 2062. The parking space administration information is a collection of records including parking IDs, XL, YL, XR, YR, and a passage location element and is illustrated in tabular form. The parking IDs are information identifying each parking space, e.g., a serial number. However, the parking ID may be omitted. This is because each parking space can also be identified by XL, YL, XR, YR. Here, parking space administration information is information of the parking space used, but when reversed, it can be said to be information of the free space of the parking lot P.

XL and YL are numbers indicating the upper left mesh position of the parking space. In addition, XR and YR are numbers indicating the positions of the meshes at the lower right of the parking space. The path location is information indicating in which direction the parking space leads to any of the passages. The value of the passage location is, for example, a combination of one of upper, lower, left, and right and the passage ID. Values upper, lower, left, and right of passage location indicate that there is a passage on the top, bottom, left, and right sides of a parking space when the running unit 100 is defined to be heading up. The passage ID indicates a passage leading to the parking space. However, if the value of the passage location is blank, it indicates that parking space does not come into direct contact with any passage. Upper, lower, left, and right are directions on FIG. 10, respectively.

FIG. 12 is a diagram illustrating passage management information of the parking lot information database 2062. The passage management information is information that defines the position of the passages. The passage management information is a set of records containing passage ID, XL, YL, XR, YR, and the next passage location components, and is illustrated in a tabular form. The passage IDs are the identity information of the respective passage, XL and YL are numbers indicating the positions of the upper left meshes of the passage. XR and YR are numbers indicating the positions of the meshes at the lower right of the passage. The next passage location is passage ID of the next passage leading to the passage.

For example, if the next passage location is I, J, it indicates that the passage leads to two next passages denoted by I, J with passage IDs. For example, if the next passage location is I and outgoing path side, it indicates that this passage is connected to the next passage indicated by I in passage ID and further connected to the outgoing path RE via the next passage. For example, when the next passage location is I and incoming path RE side, it indicates that this passage is connected to the next passage indicated by I in passage ID and further connected to the incoming path RI via the next passage.

The system S2 can determine on which route the reserved parking space is from incoming path RI to outgoing path RE by means of parking space administration information and passage management information. In addition, the system S2 can determine that the reserved parking space is not connected to any passage by parking space administration information.

Figure 13:
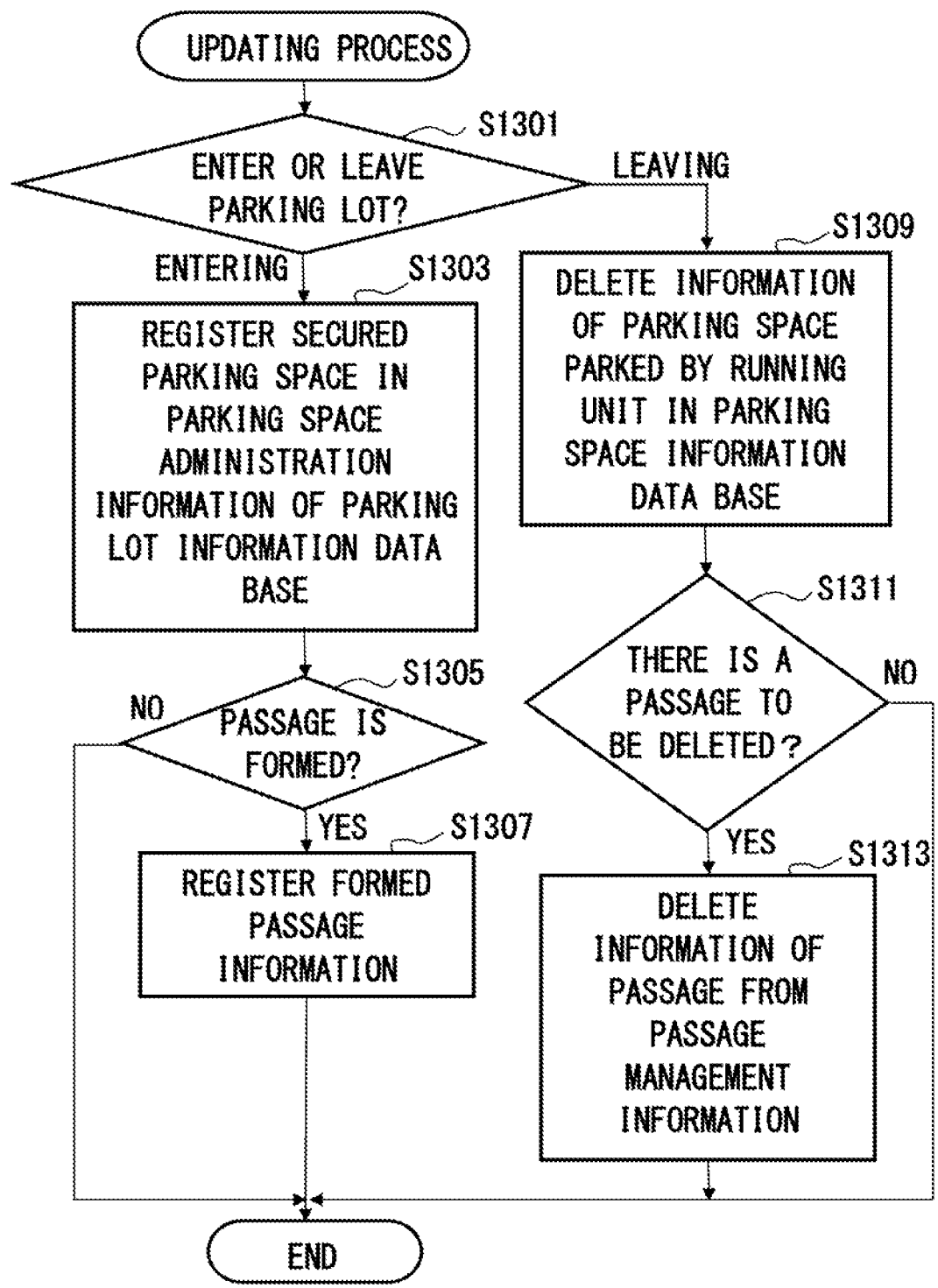
FIG. 13 is a flow chart according to a control unit of a server apparatus in the second embodiment.

FIG. 13 is a diagram illustrating in detail the updating process in the second embodiment (corresponding to step S611 of FIG. 6 or step S901 of FIG. 9 in the first embodiment). In the second embodiment, since passage L1, L2, and the like are formed according to the predetermined rule, the updating process differs from that in the first embodiment.

In this process, the update unit 2051 of the space processing unit 2044 acquires information of whether any vehicle enters or leaves the parking lot (S1301). That is, server apparatus 200 in the system S2 detects that any running unit 100 has reached the predetermined area PA of parking lot P, based on the output from the infrared sensor IS provided in the parking lot gate for running units incoming of the predetermined area PA. Similarly, the system S2 senses leaving running units leaving the parking lot based on the output front the infrared sensor IS provided on the gate for leaving the parking lot. These pieces of detected information are transmitted to the update unit 2051. Information of the incoming and/or leaving the parking lot may be acquired by any other method and/or unit described in Embodiment 1.

In the event of incoming, since a change has occurred in free spaces of the parking lot, the update unit 2051 registers the secured parking space in the parking space administration information (step S1303). Then, the update unit 2051 determines whether or not to form a passage according to a predetermined rule (step S1305). For example, if a passage has not yet been formed for a parking space parked N consecutively in the vertical direction, it is determined that a passage register is required (affirmative determination in step S1305), and a passage is formed on the rear side with respect to the traveling direction of the parking space, as in passage L1 of FIG. 10. In this instance, the update unit 2051 registers the formed passage in the passage management information of the parking lot information data base 2062 (step S1307).

In the event of leaving the parking lot, a change has occurred in free spaces of the parking lot, so the update unit 2051 deletes information of the parking space parked by running 100 in the parking space administration information (step S1309). Then, the update unit 2051 determines whether or not there is a passage to be deleted (step S1311). For example, if a passage is not contiguous to any parked parking space (Yes in step S1311), the passage is deleted. In this instance, the update unit 2051 deletes information of the passage from the passage management information of the parking lot information data base 2062 (step S1313). At this time, the update unit 2051 modifies the record of passage management information where the deleted passage had been set as the following passage.

According to the system S2 of the second embodiment, unlike the system S1 of the first embodiment, there is no need to presuppose that a plurality of parking space XiYj (e.g., j=11, 12, . . . ) are grouped together. That is, the system S2 can freely form a parking space by combining the regions partitioned by the meshes and assign the same to the running unit 100.

The above embodiment is merely an example, and the scope disclosure may be appropriately modified and practiced without departing from the gist thereof. The processing and/or means described in the present disclosure can be carried out either partially or freely in combination, provided that technical inconsistencies do not occur.

Furthermore, a process that is described to be performed by one apparatus may be shared and performed by a plurality of apparatuses. For example, server apparatus 200, which is an information processing apparatus, does not have to be a single computer and may be configured as a system comprising a plurality of computers. Processes described to be performed by different apparatuses may be performed by one apparatus. Which function is to be implemented by which hardware configuration its a computer system may be flexibly changed.

The disclosed system may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), read-only memories (ROMs), random access memories (RAMs), EPROMs, EEPROMs, magnetic cards, flash memories, optical cards, and any type of medium suitable for storing electronic instructions.

What is claimed is:

1. An information processing apparatus comprising a controller, wherein the controller performs:
   obtaining a size of a vehicle to be parked in a parking lot;
   obtaining information of a current free space of the parking lot;
   securing from the current free space of the parking lot a parking space that the obtained size matches; and
   providing the vehicle with guidance information for driving the vehicle to the secured parking space,
   wherein the securing the parking space comprises:
   obtaining schedule information of the vehicle leaving the parking lot; and
   selecting the parking space to park the vehicle from the free space of the parking lot according to the obtained schedule information of the vehicle leaving the parking lot.

2. The information processing apparatus according to claim 1, the controller further performs updating the information of the current free space of the parking lot when a change occurs in the current free space of the parking lot.

3. The information processing apparatus according to claim 1, the guidance information is provided to a device that controls the vehicle.

4. The information processing apparatus according to claim 1, the guidance information is provided to a device with a displaying unit that is visible to a driver driving the vehicle.

5. The information processing apparatus according to claim 1, wherein the selecting the parking space comprises:
   referencing a parking space of another vehicle having another schedule information of leaving the parking lot, the other schedule information satisfying a predetermined condition with respect to the obtained schedule information of the vehicle leaving the parking lot: and
   selecting the parking space associated with the parking space of the other vehicle so as to suppress free spaces in the parking lot from having a moth-eaten appearance.

6. The information processing apparatus according to claim 1, wherein the securing the parking space includes adjusting partition line data partitioning the parking space in the parking lot to match the obtained size.

7. The information processing apparatus according to claim 6, wherein the adjusting the partition line data comprises adjusting the partition line data to vary a length of the parking space corresponding to a longitudinal direction of the vehicle parked in the parking space.

8. The information processing apparatus according to claim 1, wherein the controller further performs switching between first partition line data of the parking lot and second partition line data of the parking lot partitioning the parking space into a size differing from a size of the parking space partitioned by the first partition line data according to at least a period of time.

9. An information processing method executed by at least one computer, the information processing method comprising:
   obtaining a size of a vehicle to be parked in a parking lot;
   obtaining information of a current free space of the parking lot;
   securing a parking space in the current free space of the parking lot that the obtained size matches; and
   providing the vehicle with guidance information for driving the vehicle to the secured parking space,
   wherein the securing the parking space includes:
   obtaining schedule information of the vehicle leaving the parking lot; and
   selecting a parking space to park the vehicle from the free space of the parking lot according to the obtained schedule information of leaving the parking lot.

10. The information processing method according to claim 9, further comprising updating the information of the current free space of the parking lot when a change occurs in the current free space of the parking lot.

11. The information processing method according to claim 9, wherein the guidance information is provided to a device that controls the vehicle.

12. The information processing method according to claim 9, wherein the guidance information is provided to a device with a displaying unit that is visible to a driver driving the vehicle.

13. The information processing method according to claim 9, wherein selecting the parking space comprises:
   referencing a parking space of another vehicle having another schedule information of leaving the parking lot, the other schedule information satisfying a predetermined condition with respect to the obtained schedule information of the vehicle leaving the parking lot; and selecting the parking space associated with the parking space of the other vehicle so as to suppress free spaces in the parking lot from having a moth-eaten appearance.

14. The information processing method according to claim 9, wherein the securing the parking space includes adjusting partition line data partitioning the parking space in the parking lot to match the obtained size.

15. The information processing method according to claim 14, wherein the adjusting the partition line data comprises adjusting the partition line data to vary a length of the parking space corresponding to a longitudinal direction of the vehicle parked in the parking space.

16. The information processing method according to claim 9, wherein the at least one computer switches first partition line data of the parking lot and second partition line data of the parking lot partitioning the parking space into a size differing from a size of parking space partitioned by the first partition line data according to at least a period of time.

17. A system comprising an input device and an information processing apparatus, the information processing apparatus comprising a controller, the controller executing:

obtaining a size of a vehicle to be parked in a parking lot by the input device;

obtaining information of a current free space of the parking lot;

securing a parking space that the obtained size matches from the current free space of the parking lot; and providing the vehicle with guidance information for driving the vehicle to the secured parking space, wherein the securing the parking space comprises:

obtaining schedule information of the vehicle leaving the parking lot; and selecting the parking space to park the vehicle from the free space of the parking lot according to the obtained schedule information of the vehicle leaving the parking lot.

18. The system according to claim 17, wherein a display device is provided in the parking lot for displaying a partition line so that the partition line is visible to a driver who drives the vehicle and wherein the information processing apparatus provides the display device with the guidance information and the display device displays the secured parking space.

* * * * *